G. HALDER.
ARTIFICIAL BAIT.
APPLICATION FILED NOV. 11, 1919.

1,345,173.

Patented June 29, 1920.

Fig. 1.

Fig. 2.

Inventor:
George Halder
By Young & Young
Attorneys.

Witness:

UNITED STATES PATENT OFFICE.

GEORGE HALDER, OF MILWAUKEE, WISCONSIN.

ARTIFICIAL BAIT.

1,345,173. Specification of Letters Patent. Patented June 29, 1920.

Application filed November 11, 1919. Serial No. 337,188.

*To all whom it may concern:*

Be it known that I, GEORGE HALDER, a citizen of the United States, and resident of Milwaukee, in the county of Milwaukee and State of Wisconsin, have invented certain new and useful Improvements in Artificial Bait; and I do hereby declare that the following is a full, clear, and exact description thereof.

This invention relates to improvements in angler's bait or lures for use in casting, trolling, or surface fishing.

The principal object of this invention is to provide an artificial bait of this character which will be absolutely "weedless". Heretofore such a bait has been impossible to obtain chiefly because of the fact that the barbs or hooks projected from the body thereof and formed elements which not only retarded the passage of the lure through the water, but also rendered entanglement with any obstruction easy. Therefore in the present invention the fish hooks are concealed as much as possible during normal actions of the bait.

In this connection it is also an object of the invention to provide a simple and efficient means for projecting the fish hooks or barbs from their concealed position upon retardation of the body as by the engagement thereof in a fish's mouth.

A still further object is to provide a means on the bait body whereby the fish grabbing at the bait may obtain an effective grip thereon.

With these and other objects in view which will become apparent as the description proceeds the invention relates to the improved combination and arrangement of parts shown in the drawing and which will be hereinafter more particularly described.

Referring to the drawing:

Figure 1 is a longitudinal sectional view through an artificial bait constructed in the manner of my invention, the hooks being in retracted position, and Fig. 2 is a side elevational view, partially in longitudinal section, of the bait shown in Fig. 1, the parts thereof being in projected position.

The principal feature of the invention being the means for projecting the fish hooks or barbs from the body of the bait when the same is grabbed by a fish, it is immaterial from what portion of the body these hooks or barbs extend or in what manner they are normally sheathed. Therefore it is to be understood that the illustrated embodiment is merely one manner by which the objects of the invention may be procured.

In this embodiment the bait body 1 is minnow shaped or any other conventional shape and is provided with a longitudinally extended central bore 2 opening through the opposite ends thereof. The outer surface of the body has a plurality of annular grooves 3 in which yieldable bands 4 are secured. These bands are constructed of fabric or any suitable material which provides means on which the teeth or roughened mouth surfaces of a fish may grip. In other words these bands are adapted to allow a fish to obtain a sufficient hold on the bait to permit the tightening of the line 5 and the projecting of the normally concealed fish hooks 6 and 7.

The fish line 5 is extended through the bore 2 of the bait body and has one end secured to the shank 8 of the hooks 6, which hooks are located at the rear end of the body. These hooks are partially hidden from view by a tuft of feathers or other attracting element 9 secured to the shank 8.

Disposed transversely of the bore 2 and located to one side of the center line thereof and adjacent the rear end of the body 1 is a pin 10, between which and the adjacent wall of the bore the line 5 is disposed. When the bait is set for use, the inner end of the shank 8 is forced in the bore 2 on the opposite side of the pin 10 from the line 5 as shown in Fig. 1, thus doubling the end portion of the latter upon itself. The points of the hooks are located in engagement with the rear end of the body and out of the path of weeds or other obstructions which may be encountered.

A spring finger 11 carried by the shank 8 engaging the surface of the bore 2 as in Fig. 1 prevents the ready outward movement of the hooks 6. In fact the tension of this spring is sufficient to retain the hooks in their retracted position during casting and trolling and until a fish or the like grabs the bait body and holds it relatively stationary while a pull is being exerted on the line 5 by the fisherman. In other words it will be seen from the last mentioned figure that if the line 5 is pulled in one direction and the bait body in the other, said line will move around the pin 10 and force the hooks in a direction opposite to the direction of the moment of force exerted on said line.

It will be also appreciated from the drawing that other hooks, such as the hooks 7 may be located in other parts of the body 1 than the rear end. The two hooks 7 are designed to be projected radially from the bait body 1 at the same time that the hooks 6 are extended longitudinally and in this connection the hooks 7 are loosely connected to the line 5 inwardly of the shank 8. When these hooks 7 are retracted their shanks are located within the bore 2 and they are manually adjusted so that their points are extended outwardly and in a direction opposite to the normal direction of travel of the bait, they being thus most compactly arranged. On the other hand when extended, the points of the hooks may assume a similar or a different direction as shown in Fig. 2, owing to the loose connection of the hooks with the line 5, but the shanks will be in slots 12 formed in the front end of the body 1. A pair of substantially transverse pins 13 extending across the bore 2 adjacent this front end limit the forward movement of the line 5 through the bore 2 by the engagement of the shanks of the hooks 7 therewith. Also these pins 13 together with the inner ends of the slots 12 cause the hooks to be projected radially when a pull is exerted on said line in the manner above set forth. Although when in retracted position the hooks 6 and 7 present no obstruction to weeds and the like, the operation of the bait is rendered more efficient by the provision of a cap 14 which fits over the front end bait body. This cap is conical shaped and has a plug 15 which seats in the end bore 2 during retraction of the hooks. Inasmuch as the cap 14 is secured to the line 5, it will be obvious that should the cap engage an obstruction, the abnormal pull given the line 5 will be exerted entirely on the cap and not imparted to the bait 1. The hooks will not be thereby projected.

I claim:

1. A bait comprising a tubular body, a pin disposed within the bore of the body transversely thereof, a fish hook normally retracted within the bore, and having its shank disposed longitudinally thereof and between said pin and the adjacent wall of said bore, and a line extended into the bore of the body on the opposite side of the pin from said shank and connected to the latter, said line causing the shank of the hook to be projected substantially radially to the body upon an abnormal pull on the former.

2. A bait comprising a tubular body, having a longitudinally extending guide slot, and a pin disposed within the bore of the body transversely thereof, a fish hook normally retracted within the bore and having its shank normally disposed longitudinally thereof and between said pin and the adjacent wall of said bore, and means for projecting the hook substantially radially to the body and disposing the shank thereof in said guide slot including a line extended into the bore of the body on the opposite side of said pin from said fish hook shank and connected to the latter, said line causing the hook to be projected by an abnormal pull thereon.

3. A bait comprising a tubular body, a pair of transverse pins in said body, a pair of fish hooks normally retracted within the body, the shanks of the hooks being disposed between said pins and the adjacent wall of the bore in the body, and a line extended into the bore of the body between said pins and having the shanks of the hooks connected thereto.

4. A bait comprising a tubular body, having a pair of diametrically opposed longitudinally extending guide slots, a pair of transverse pins in said body, a pair of fish hooks normally retracted within the body, the shank of the hook being disposed between said pins and the adjacent wall of the bore in said body, and a line extending into the bore of the body between said pins and having the shanks of the hooks connected thereto whereby to project the same substantially radially to the body through said guide slots.

5. A bait comprising a tubular body, a transverse pin in said body, a fish hook normally retracted in the body and having its shank disposed to one side of the pin, a line connected to said hook and having its main portion disposed on the opposite side of the pin from the shank of the hook, a spring finger having one end connected with the shank of the hook, the other end being frictionally engaged with the bore of said body when the shank is retracted within the latter.

6. A bait comprising a tubular body open at one end, a fish hook normally retracted within the bore of said body, a line extended into said bore and connected with the fish hook whereby to project the same upon an abnormal pull thereon, a conical cap disposed over the forward end of the body and connected with said line, and a plug carried by the cap and snugly seated in said open end of the bore of the body.

7. A bait comprising an elongated body, a fish hook carried by said body, said body having an annular groove surrounding the same and a yieldable band secured in said groove.

In testimony that I claim the foregoing I have hereunto set my hand at Milwaukee, in the county of Milwaukee and State of Wisconsin.

GEORGE HALDER.